United States Patent
Wang et al.

(10) Patent No.: US 11,338,702 B2
(45) Date of Patent: May 24, 2022

(54) CONTROL SYSTEM AND METHOD FOR BATTERY PACK HEATING SYSTEM, AND BATTERY PACK HEATING MANAGEMENT SYSTEM

(71) Applicant: Contemporary Amperex Technology Co., Limited, Ningde (CN)

(72) Inventors: Tiancong Wang, Ningde (CN); Xiyang Zuo, Ningde (CN); Zhimin Dan, Ningde (CN); Xiong Zheng, Ningde (CN); Bao Li, Ningde (CN)

(73) Assignee: Contemporary Amperex Technology Co., Limited, Ningde (CN)

(*) Notice: Subject to any disclaimer, the term of this patent is extended or adjusted under 35 U.S.C. 154(b) by 0 days.

(21) Appl. No.: 17/390,873

(22) Filed: Jul. 31, 2021

(65) Prior Publication Data

US 2021/0354593 A1    Nov. 18, 2021

Related U.S. Application Data

(63) Continuation of application No. PCT/CN2020/089656, filed on May 11, 2020.

(30) Foreign Application Priority Data

Jun. 24, 2019 (CN) .......................... 201910547905.3

(51) Int. Cl.
*B60L 58/27* (2019.01)
*H01M 10/44* (2006.01)
(Continued)

(52) U.S. Cl.
CPC ........... *B60L 58/27* (2019.02); *H01M 10/443* (2013.01); *H01M 10/615* (2015.04);
(Continued)

(58) Field of Classification Search
CPC ............ H01M 10/615; H01M 10/625; H01M 10/633; H01M 10/443; H01M 10/44;
(Continued)

(56) References Cited

U.S. PATENT DOCUMENTS

2013/0134945 A1    5/2013  Xu et al.

FOREIGN PATENT DOCUMENTS

CN    102074753 A    5/2011
CN    102447148 A    5/2012
(Continued)

OTHER PUBLICATIONS

The International search report for PCT Application No. PCT/CN2020/089656, dated Aug. 13, 2020, 13 pages.
(Continued)

*Primary Examiner* — Robert L Deberadinis
(74) *Attorney, Agent, or Firm* — Law Offices of Liaoteng Wang

(57) ABSTRACT

The application provides a control system and method for a battery pack heating system. The control system includes: a battery management system configured to acquire a state parameter of a battery pack, and send heating request information to a vehicle controller when determining the state parameter of the battery pack meets a preset heating condition; a motor controller configured to send, to the vehicle controller, feedback information indicating that a motor of the battery pack heating system is in a non-operating state, when determining the motor is in the non-operating state, and control, in response to a first control signal, a target upper bridge arm switch module and a target lower bridge arm switch module to be periodically turned on or off; and the vehicle controller configured to send the first control signal to the motor controller in response to the heating request information and the feedback information.

13 Claims, 3 Drawing Sheets

(51) Int. Cl.
*H02J 7/00* (2006.01)
*H01M 10/615* (2014.01)
*H01M 10/625* (2014.01)
*H01M 10/633* (2014.01)
*H02P 29/68* (2016.01)

(52) U.S. Cl.
CPC ....... *H01M 10/625* (2015.04); *H01M 10/633* (2015.04); *H02J 7/0068* (2013.01); *H02P 29/68* (2016.02); *B60L 2240/545* (2013.01); *H01M 2220/20* (2013.01)

(58) Field of Classification Search
CPC ................ H01M 2220/20; B60L 58/27; B60L 2240/545; H02P 29/68; H02J 7/0068; H02J 7/00
See application file for complete search history.

(56) References Cited

FOREIGN PATENT DOCUMENTS

| | | | |
|---|---|---|---|
| CN | 103419614 | A | 12/2013 |
| CN | 103560304 | A | 2/2014 |
| CN | 104538701 | A | 4/2015 |
| CN | 103560304 | B | 5/2016 |
| CN | 105762434 | A | 7/2016 |
| CN | 104538701 | B | 8/2016 |
| CN | 106985657 | A | 7/2017 |
| CN | 107390571 | A | 11/2017 |
| CN | 107662501 | A | 2/2018 |
| CN | 108394254 | A | 8/2018 |
| CN | 108847513 | A | 11/2018 |
| CN | 105762434 | B | 12/2018 |
| CN | 109823234 | A | 5/2019 |
| CN | 109910684 | A | 6/2019 |
| CN | 110970672 | A | 4/2020 |
| DE | 102014011828 | A1 | 2/2016 |
| JP | 2014072955 | A | 4/2014 |
| JP | 2015195522 | A | 11/2015 |
| JP | 2015216776 | A | 12/2015 |
| JP | 2016165201 | A | 9/2016 |
| JP | 2017212764 | A | 11/2017 |
| WO | 2012014392 | A1 | 2/2012 |
| WO | 2018189709 | A1 | 10/2018 |

OTHER PUBLICATIONS

The First Office Action for China Application No. 201910547905.3, dated Aug. 11, 2020, 6 pages.
The Grant Notification for China Application No. 201910547905.3, dated Oct. 10, 2020, 6 pages.
The First Office Action for China Division Application No. 202011296187.6, dated Oct. 29, 2021, 21 pages.
The First Office Action for Europe Application No. 20181345.8, dated May 31, 2021, 4 pages.
The First Office Action for Japan Application No. 2020-042525, dated Jan. 25, 2021, 7 pages.
The Rejection Decision for Japan Application No. 2020-042525, dated Aug. 16, 2021, 6 pages.
The extended European search report for EP Application No. 20181345.8, dated Nov. 23, 2020, 7 pages.

CONTROL SYSTEM AND METHOD FOR BATTERY PACK HEATING SYSTEM, AND BATTERY PACK HEATING MANAGEMENT SYSTEM

CROSS REFERENCE TO RELATED APPLICATIONS

This application is a continuation of International Application No. PCT/CN2020/089656, filed on May 11, 2020, which claims priority to Chinese Patent Application No. 201910547905.3 filed on Jun. 24, 2019, all of which are hereby incorporated by reference in their entireties.

FIELD

The present application generally relates to the field of battery power, and particularly to a control system and method for a battery pack heating system, and a battery pack heating management system.

BACKGROUND

With development of new energy, new energy is used as power in more and more fields. Due to advantages of high energy density, recyclable charging, safety and environmental friendliness and so on, batteries are widely used in new energy vehicles, consumer electronics, energy storage systems and other fields.

However, use of a battery in low temperature environment is subject to certain restrictions. Specifically, discharge capacity of the battery is degraded seriously in low temperature environment, and the battery cannot be charged in low temperature environment. Therefore, in order to be able to use the battery normally, it is necessary to heat the battery in low temperature environment.

At present, the battery may be internally heated by using an alternating current to excite electrochemical material inside the battery. An existing control method is to control an energy storage module of a motor in a battery pack heating system to periodically store and release electric energy by controlling switch modules of an inverter in the battery pack heating system to be periodically turned on or off, so that an alternating current can be generated in a circuit where the battery pack is located and used to heat the battery pack. Such a control method has a low control accuracy.

SUMMARY

Embodiments of the application provide a control system and method for a battery pack heating system, and a battery pack heating management system.

In an aspect, the embodiments of the application provide a control system for a battery pack heating system, comprising: a battery management system configured to acquire a state parameter of a battery pack, and send heating request information to a vehicle controller when it is determined that the state parameter of the battery pack meets a preset heating condition; a motor controller configured to send, to the vehicle controller, feedback information indicating that a motor of the battery pack heating system is in a non-operating state, when it is determined that the motor is in the non-operating state, and control, in response to a first control signal, a target upper bridge arm switch module and a target lower bridge arm switch module to be periodically turned on or off, so as to heat the battery pack; and the vehicle controller configured to send the first control signal to the motor controller in response to the heating request information and the feedback information, wherein the target upper bridge arm switch module is an upper bridge arm switch module of any bridge arm of three phase bridge arms in an inverter of the battery pack heating system, and the target lower bridge arm switch module is a lower bridge arm switch module of any of the three phase bridge arms other than the bridge arm that comprises the target upper bridge arm switch module.

In another aspect, the embodiments of the application provide a control method for a battery pack heating system. The control method is to be applied to the control system for the battery pack heating system according to the embodiments of the application. The control method comprises: acquiring, by the battery management system, a state parameter of the battery pack, and sending heating request information to the vehicle controller when it is determined that the state parameter of the battery pack meets a preset heating condition; sending, by the motor controller, feedback information to the vehicle controller indicating that a motor of the battery pack heating system is in a non-operating state, when it is determined that the motor is in the non-operating state; sending, by the vehicle controller, a first control signal to the motor controller in response to the heating request information and the feedback information; and controlling, by the motor controller in response to the first control signal, the target upper bridge arm switch module and the target lower bridge arm switch module to be periodically turned on or off, so as to heat the battery pack.

In another aspect, the embodiments of the application provide a battery pack heating management system, comprising the control system for the battery pack heating system and the battery pack heating system according to the embodiments of the application;
wherein the battery pack heating system comprises the inverter connected with the battery pack and the motor connected with the inverter.

BRIEF DESCRIPTION OF THE DRAWINGS

In order to more clearly illustrate technical solutions of embodiments of the present application, accompanying drawings used for the embodiments of the present application will be briefly described below, and for those skilled in the art, other drawings can be obtained from these drawings without any creative work.

DETAILED DESCRIPTION

Features and exemplary embodiments according to various aspects of the present application will be further described in detail below. In order to make objects, technical solutions and advantages of the present application more apparent, the present application will be further described in detail below with reference to the accompanying drawings and embodiments. It is understood that specific embodiments described herein are only to be construed as illustrative but not limiting. The present application may be practiced without some specific details of the present application. The following description of embodiments is merely intended to provide a better understanding of the present application by illustrating examples of the present application.

Embodiments of the present application provide a control system and method for a battery pack heating system, and a battery pack heating management system. In a specific scenario in which a battery pack heating system is needed to heat a battery pack due to a low temperature of the battery pack, the control method and system provided by the embodiments of the present application can be applied to control the battery pack heating system. The battery pack may include at least one battery module or at least one battery unit, which is not limited herein. The battery pack may be applied to an electric vehicle to supply power to a motor of the electric vehicle as a power source for the electric vehicle. The battery pack can also supply power to other powered devices in the electric vehicle, such as an in-vehicle air-conditioner, a vehicle player, and the like. In the embodiments of the application, a battery management system, a motor controller and a vehicle controller together cooperate to control the battery pack heating system, thereby improving safety of the battery pack heating.

It should be noted that, in this context, relational terms such as first and second are used merely to distinguish one entity or operation from another entity or operation, and do not necessarily require or imply that there is any real relationship or order between such entities or operations. Furthermore, the term "comprise", "include" or any other variations thereof is intended to encompass a non-exclusive inclusion, such that a process, method, article, or device comprising a plurality of elements not only includes those elements, but also includes other elements not explicitly listed or elements inherent to the process, method, article, or device. An element that is defined by the phrase "comprising", without limiting the application, does not exclude the presence of additional same elements in the process, method, article, or device comprising the element.

Figure 1:
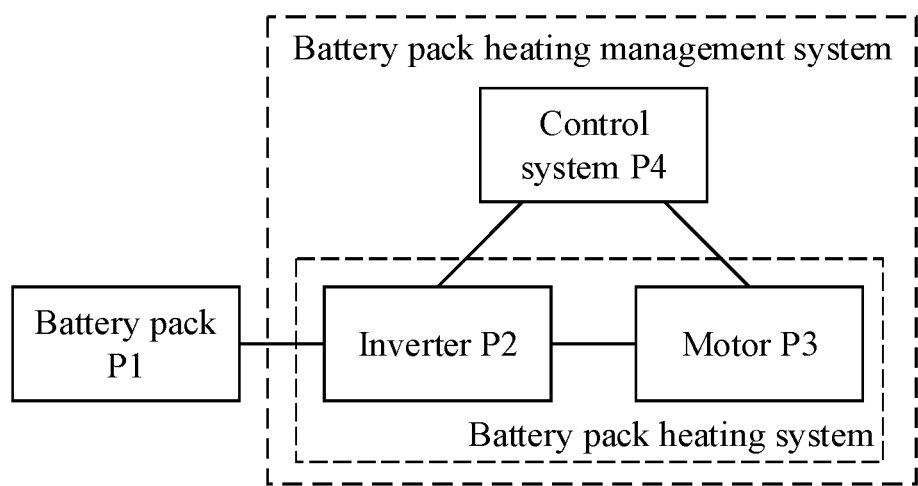
FIG. 1 is a schematic structural diagram of a battery pack heating management system according to an embodiment of the present application.

FIG. 1 is a schematic structural diagram of a battery pack heating management system according to an embodiment of the present application. As shown in FIG. 1, the battery pack heating management system includes a battery pack heating system and a control system P4 for the battery pack heating system.

The battery pack heating system includes an inverter P2 connected to the battery pack P1 and a motor P3 connected to the inverter.

In some embodiments of the application, the inverter P2 includes three phase bridge arms. Each phase bridge arm of the three phase bridge arms includes an upper bridge arm and a lower bridge arm. The upper bridge arm is provided with a switch module, the lower bridge arm is provided with a switch module, and the switch module includes a diode.

For the switch module of the upper bridge arm, an anode of the diode is connected to a connection point of the upper bridge arm and the lower bridge arm, and a cathode of the diode is located between the upper bridge arm and a positive electrode of the battery pack.

For the switch module of the lower bridge arm, an anode of the diode is located between the lower bridge arm and a negative electrode of the battery pack, and a cathode of the diode is connected to the connection point of the upper bridge arm and the lower bridge arm.

In the embodiments of the present application, under the control of the control system P4 for the battery pack heating system, the battery pack heating system can implement the heating of the battery pack P1 by controlling the battery pack P1 to be periodically charged and discharged.

Figure 2:
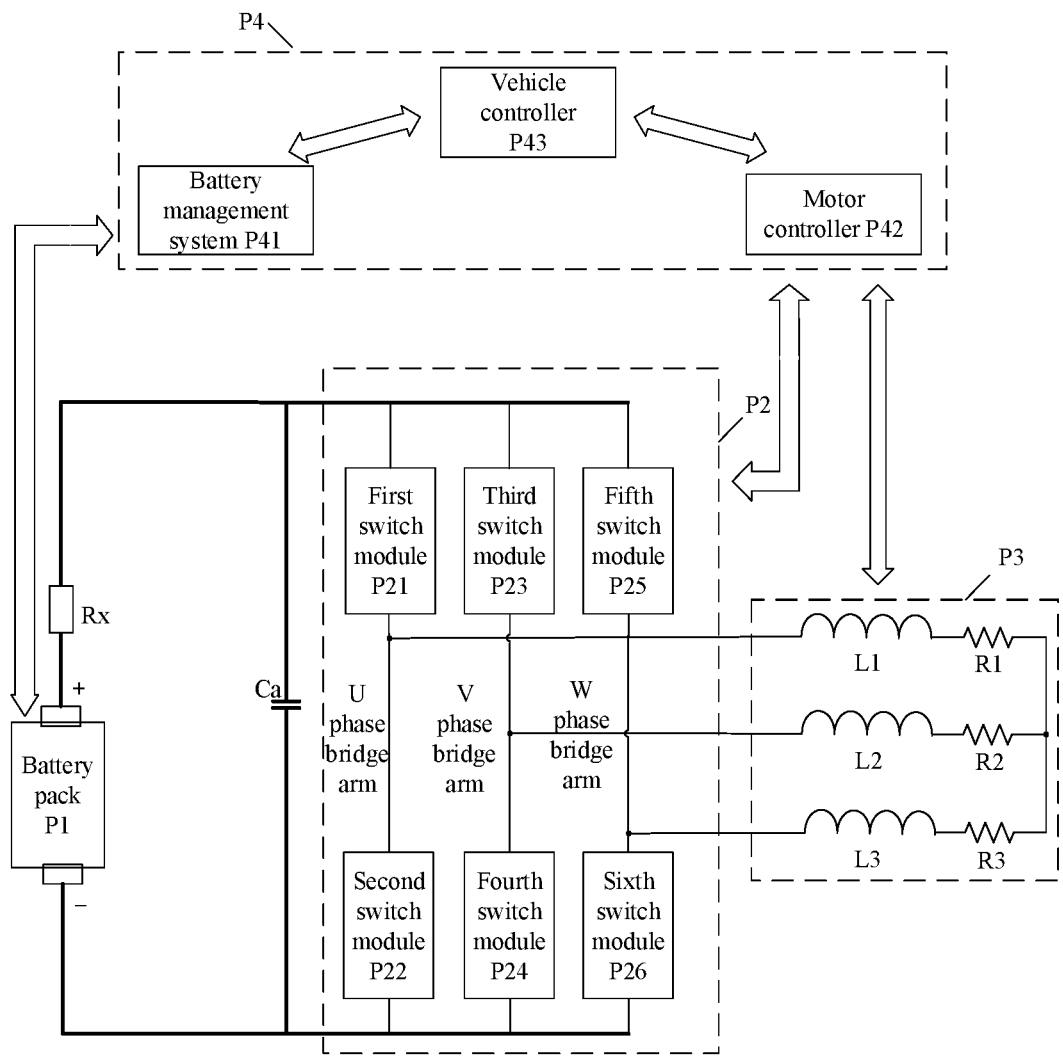
FIG. 2 is a schematic structural diagram of a battery pack heating management system according to an embodiment of the present application.

FIG. 2 is a schematic structural diagram of a battery pack heating management system according to an embodiment of the present application. The battery pack heating management system includes a battery pack heating system and a control system for the battery pack heating system. As shown in FIG. 2, the battery pack heating system includes an inverter P2 connected to the battery pack P1 and a motor P3 connected to the inverter.

The inverter P2 includes three phase bridge arms connected in parallel. Each phase bridge arm of the three phase bridge arms includes an upper bridge arm and a lower bridge arm. Each upper bridge arm is provided with a switch module, and each lower bridge arm is provided with a switch module.

For example, referring to FIG. 2, the three phase bridge arms may include a U-phase bridge arm, a V-phase bridge arm, and a W-phase bridge arm, respectively. The switch module at the upper bridge arm of the U-phase bridge arm is a first switch module P21, and the switch module at the lower bridge arm of the U-phase bridge arm is a second switch module P22. The switch module at the upper bridge arm of the V-phase bridge arm is a third switch module P23, and the switch module at the lower bridge arm of the V-phase bridge arm is a fourth switch module P24. The switch module at the upper bridge arm of the W-phase bridge arm is a fifth switch module P25, and the switch module at the lower bridge arm of the W-phase bridge arm is a sixth switch module P26.

The motor P3 includes three phase energy storage modules respectively corresponding to the three phase bridge arms. The three phase energy storage modules are connected to each other at one end thereof, and the other end of each of the three phase energy storage modules is respectively connected to a connection point of an upper bridge arm and a lower bridge arm of a corresponding bridge arm. In some examples, the three phase energy storage modules can be stator inductors.

For example, with continued reference to FIG. 2, a U-phase stator inductor L1 corresponds to the U-phase bridge arm, a V-phase stator inductor L2 corresponds to the V-phase bridge arm, and a W-phase stator inductor L3 corresponds to the W-phase bridge arm. The U-phase stator inductor L1, the V-phase stator inductor L2, and the W-phase stator inductor L3 are connected to each other at one end thereof.

For a connection relationship between each phase energy storage module and each bridge arm, taking the U-phase stator inductor L1 as an example, the other end of the U-phase stator inductor L1 is connected to the connection point of the upper-bridge-arm switch module P21 and the lower-bridge-arm switch module P22 of the U-phase bridge arm.

As an example, with continued reference to FIG. 2, the battery pack heating system further includes a support capacitor Ca in parallel with respective phase bridge arms of the inverter P2. For example, the support capacitor Ca provides a DC support (Dc-link). One end of the support capacitor Ca is connected to the positive electrode of the battery pack P1, and the other end is connected to the negative electrode of the battery pack P2. The support capacitor Ca is used to absorb a high ripple voltage or current that may be generated when the switch module of the inverter P2 is turned off, so that voltage and current fluctuations in the battery pack heating system can be kept within an allowable range, thereby avoiding voltage and current overshoot.

As an example, the motor P3 further includes resistor modules respectively connected to the three phase energy storage modules. Specifically, the three phase energy storage modules are connected to each other at one end thereof via a corresponding resistor module.

For example, with continued reference to FIG. 2, one end of the U-phase stator inductor L1 is connected to one end of the resistor module R1, one end of the V-phase stator inductor L2 is connected to one end of the resistor module R2, and one end of the W-phase stator inductor L3 is connected to one end of the resistor module R3. The other end of the resistor module R1 and the other end of the resistor module R2 are connected to the other end of the resistor module R3.

The battery pack heating system of the embodiments of the application can heat the battery pack P1 by periodically charging and discharging the battery pack P1 under the control of the control system P4 of the battery pack heating system. Specifically, a motor controller P42 in the control system for the battery pack heating system can control, via a periodic driving signal, a target upper bridge arm switch module and a target lower bridge arm switch module in the switch module of the inverter P2 to be periodically turned on or off, so that the energy storage module can periodically store and release power and thus periodically charge and discharge the battery pack P1. For example, when the driving signal outputted by the motor controller P42 is at a high level, the target upper bridge arm switch module and the target lower bridge arm switch module are turned on, and the energy storage module is charged; when the driving signal outputted by the motor controller is at a low level, the target upper bridge arm switch module and the target lower bridge arm switch module are turned off, and the energy storage module is discharged.

In the embodiments of the application, the target upper bridge arm switch module is an upper bridge arm switch module of any bridge arm of the three phase bridge arms, and the target lower bridge arm switch module is a lower bridge arm switch module of any of the three phase bridge arms other than the bridge arm that comprises the target upper bridge arm switch module.

Exemplarily, the target upper bridge arm switch module and the target lower bridge arm switch module in FIG. 2 may include the following six cases:

In the first case, the target upper bridge arm switch module is the upper bridge arm switch module P21 of the U-phase bridge arm; the target lower bridge arm switch module is the lower bridge arm switch module P24 of the V-phase bridge arm.

In the second case, the target upper bridge arm switch module is the upper bridge arm switch module P21 of the U-phase bridge arm; the target lower bridge arm switch module is the lower bridge arm switch module P26 of the W-phase bridge arm.

In the third case, the target upper bridge arm switch module is the upper bridge arm switch module P23 of the V-phase bridge arm; the target lower bridge arm switch module is the lower bridge arm switch module P22 of the U-phase bridge arm.

In the fourth case, the target upper bridge arm switch module is the upper bridge arm switch module P23 of the V-phase bridge arm; the target lower bridge arm switch module is the lower bridge arm switch module P26 of the W-phase bridge arm.

In the fifth case, the target upper bridge arm switch module is the upper bridge arm switch module P25 of the W-phase bridge arm; the target lower bridge arm switch module is the lower bridge arm switch module P22 of the U-phase bridge arm.

In the sixth case, the target upper bridge arm switch module is the upper bridge arm switch module P25 of the W-phase bridge arm; the target lower bridge arm switch module is the lower bridge arm switch module P24 of the V-phase bridge arm.

It should be noted that the target upper bridge arm switch module and the target lower bridge arm switch module in each cycle of the periodic ON and OFF may be the same or different, which is not limited herein. For example, in each cycle, the driving signal may drive the first switch module P21 and the fourth switch module P24 to be turned on or off. For another example, in a first cycle, the driving signal may drive the first switch module P21 and the fourth switch module P24 to be turned on or off; in the second cycle, the driving signal may drive the third switch module P23 and the fifth switch module P25 to be turned on or off; in the third cycle, the driving signal may drive the first switching module P21 and the sixth switching module P26 to be turned on or off. That is, in different cycles, the driving signal may drive different target upper bridge arm switch modules and different target lower bridge arm switch modules.

It should also be noted that when the switch module of the upper bridge arm and the switch module of the lower bridge arm in a same bridge arm are both turned on, for example, the upper bridge arm switch module and the lower bridge arm switch module in the same bridge arm are simultaneously turned on for more than 10 milliseconds, it may cause a device or the battery pack P1 in the battery pack heating system to be burned down. In order to prevent the switch module of the upper bridge arm and the switch module of the lower bridge arm in the same bridge arm from being simultaneously turned on, an exclusive control for the switch module of the upper bridge arm and the switch module of the lower bridge arm in the same bridge arm can be realized in the motor controller P42 by using a logic circuit.

In some examples, various switch modules in the inverter P2 may include one or more of power switching devices, such as an Insulated Gate Bipolar Transistor (Insulated Gate Bipolar Transistor, IGBT) chip, an IGBT module, a Metal-Oxide-Semiconductor Field-Effect Transistor (Metal-Oxide-Semiconductor Field-Effect Transistor, MOSFET) and the like. Here, a combination manner and a connection manner of each IGBT device, each MOSFET device and the like in the switch module are not limited. The material type of the power switching devices described above is also not limited. For example, a power switching device made of silicon carbide (SiC) or other materials may be used. It is worth mentioning that the power switching devices described above have a diode. Specifically, the diode may be a parasitic diode or a specially configured diode. The material type of the diode is also not limited, and for example, a diode made of silicon (Si), silicon carbide (SiC), or other materials may be used.

An embodiment of the application provides a control system for a battery pack heating system. As shown in FIG. 2, the control system P4 of the battery pack heating system includes a battery management system P41, a motor controller P42, and a vehicle controller P43.

The battery management system P41 is configured to acquire a state parameter of the battery pack P1, and send heating request information to the vehicle controller P43 when it is determined that the state parameter of the battery pack P1 meets a preset heating condition.

In some embodiments of the application, the state parameter of the battery pack P1 may include: a temperature of the battery pack P1 and/or a state of charge (State of Charge, SOC) of the battery pack P1. It should be noted that the state parameter of the battery pack P1 may be other parameters that characterize the state of the battery pack P1, such as a voltage, a current, and the like of the battery pack P1, which is not limited herein.

In some embodiments, the state parameter of the battery pack P1, for example, the temperature and the SOC of the battery pack P1, can be calculated from state parameters of battery modules acquired by a Cell Management Circuit (Cell Management Circuit, CMC). Exemplarily, taking the temperature of the battery pack P1 as an example, the CMC acquires temperatures of individual battery modules in the battery pack P1, and transmits the acquired temperatures to the battery management system P41 through a communication unit. The battery management system P41 calculates the temperature of the battery pack P1 from the temperatures of the individual battery modules in the battery pack P1. The communication between the battery management system P41 and the CMC can be performed by using a wireless communication manner or a wired communication manner, which is not limited herein. The method to calculate the temperature and the SOC of the battery pack P1 is also not limited herein.

In an embodiment, the battery management system P41 can acquire sampled data of the battery module through a plurality of CMCs. A wired communication connection or a wireless communication connection may be implemented between the CMCs, for example, a daisy chain or a Controller Area Network (Controller Area Network, CAN) bus communication connection may be used, and the specific communication manner is not limited herein.

In some embodiments of the application, when the state parameter of the battery pack P1 includes the temperature of the battery pack P1, the preset heating condition includes that the temperature of the battery pack P1 is lower than an expected temperature threshold. That is to say, once it is determined that the temperature of the battery pack P1 is heated to the expected temperature threshold, the heating of the battery pack P1 may be stopped in time. For example, the expected temperature threshold may also be a minimum required temperature at which the battery pack P1 can operate normally, i.e., a temperature threshold at which the battery pack heating system needs to enter a heating mode. The heating temperature threshold can be set according to a working scene and working demands. For example, any value within a temperature range of −50° C. to 5° C. can be used, which is not limited herein. When the temperature of the battery pack P1 is lower than the heating temperature threshold, the battery pack P1 cannot operate normally and needs to be heated.

In some embodiments, when the battery management system P41 determines that the temperature of the battery pack P1 is greater than or equal to the expected temperature threshold, information indicating that the battery pack has a normal temperature and does not need to be heated may be reported to the vehicle controller P43, so that the vehicle controller P43 may issue a power-on command to the battery management system P41 based on the information to instruct the battery management system P41 to be powered on at a high voltage.

In some embodiments of the application, when the state parameter of the battery pack P1 includes the SOC of the battery pack P1, the preset heating condition includes that the SOC of the battery pack P1 is higher than a SOC threshold. The SOC threshold characterizes the SOC expected to be consumed by the heating. The SOC threshold may be set according to a working scene and working demands, such as an expected heating temperature, a current temperature, self-heating performance of the battery pack, and the like, which is not limited herein. When the SOC of the battery pack P1 is higher than the SOC threshold, it means that current electric power of the battery pack P1 is sufficient to provide the amount of power required to enter the heating mode. When the SOC of the battery pack P1 is lower than the SOC threshold, it means that the current electric power of the battery pack P1 is not enough for the heating.

In some embodiments, when the battery management system P41 determines that the SOC of the battery pack P1 is lower than or equal to the SOC threshold, information indicating that the battery pack cannot be heated due to the low SOC may be reported to the vehicle controller P43.

In some embodiments of the application, the battery management system P41 may also control an on or off state of a switch device on a connection line between the battery pack P1 and the inverter P2. For example, a main positive relay may be disposed on a connection line between the positive electrode of the battery pack P1 and the inverter P2, and a main negative relay may be disposed on a connection line between the negative electrode of the battery pack P1 and the inverter P2.

Under this condition, during the heating process, the battery management system P41 controls the switch device on the connection line between the battery pack P1 and the inverter P2 to keep in an ON state.

The motor controller P42 may be configured to send, to the vehicle controller P43, feedback information indicating that the motor P3 of the battery pack heating system is in a non-operating state, when it is determined that the motor P3 is in the non-operating state. The motor controller P42 may also be configured to, in response to a first control signal, control the target upper bridge arm switch module and the target lower bridge arm switch module to be periodically turned on or off, so as to heat the battery pack P1.

In some embodiments of the application, the non-operating state of the motor means that the motor is currently not in an operating process of converting electrical energy to mechanical energy. In some embodiments, the non-operating state of the motor may also be referred to as a shutdown state. The motor controller P42 may determine whether the motor P3 is in the non-operating state based on any determination method, which is not limited herein.

In some embodiments, when determining the motor P3 is in an operating state, the motor controller P42 may report, to the vehicle controller P43, information indicating that the motor P3 is in the operating state, so that the vehicle controller P43 can stop controlling the battery pack heating system to heat the battery pack P1.

The vehicle controller P43 may be configured to send the first control signal to the motor controller P42 in response to the heating request information and the feedback information.

The first control signal may be used to instruct the motor controller P42 to heat the battery pack P1 by controlling the target upper bridge arm switch module and the target lower bridge arm switch module to be periodically turned on or off.

According to the control system for the battery pack heating system in the embodiments of the application, the vehicle controller P43 can control the motor controller to heat the battery pack in response to the heating request information and the feedback information. Since the heating request information is sent by the battery management system P41 after the battery management system P41 determines that the acquired state parameter of the battery pack P1 meets the preset heating condition, the heating request information can indicate that the battery pack needs to be heated; since the feedback information is sent by the motor controller P42 after the motor controller P42 determines that the motor P3 in the battery pack heating system is in the non-operating state, the feedback information can indicate that the battery pack heating system meets the condition for heating the battery pack P1. Therefore, the control system in the embodiments of the application can control the battery pack heating system by using the interaction between the battery management system P41, the motor controller P42, and the vehicle controller P43, and control the battery pack heating system to heat the battery pack P1 when determining that the battery pack P1 needs to be heated and the battery pack heating system meets the heating condition, thereby improving the control accuracy of the battery pack heating system.

In some embodiments of the application, it may also be necessary to verify if various control devices in the control system P4 of the battery pack heating system are in a normal operating state, prior to controlling the battery pack heating system. In the process, the vehicle controller P43 may further be configured to determine whether the state of the vehicle controller P43, the state of the battery management system P41, and the state of the motor controller P42 are normal operating states, in response to detection of a vehicle start signal.

In some embodiments, after a driver performs a triggering operation to make the vehicle into a Power-up state, for example, after the driver starts a key on gear with a key, the vehicle controller P43 may receive the vehicle start signal, that is, the vehicle controller P43 may detect the vehicle start signal.

In some embodiments, the vehicle controller P43 may confirm whether it is in a normal operating state by self-test. In an embodiment, when the vehicle controller P43 confirms that it is in an abnormal state by the self-test, the vehicle controller P43 may send out information indicating that the vehicle controller P43 is in the abnormal state, and stop execution of any operation command.

In some embodiments, the vehicle controller P43 may be configured to send state request information to the battery management system P41 and the motor controller P42, and confirm whether the battery management system P41 and the motor controller P42 are in normal operating states according to the feedback information from the battery management system P41 and the motor controller P42.

In an embodiment, when the vehicle controller P43 receives the feedback information sent by the battery management system P41 indicating that the battery management system P41 is in a fault state, the vehicle controller P43 may send out information indicating that the battery management system P41 is in an abnormal state.

In an embodiment, when the vehicle controller P43 receives the feedback information sent by the motor controller P42 indicating that the motor controller P42 is in a fault state, the vehicle controller P43 may send out information indicating that the motor controller P42 is in an abnormal state.

In some embodiments of the application, the control system P4 of the battery pack heating system can also control the battery pack heating system in accordance with the driver's operation. Specifically, the vehicle controller P43 may be configured to send a prompt message to inform that the battery pack P1 will be heated, in response to the heating request information and the feedback information; and transmit the first control signal to the motor controller P42, in response to an input triggering operation.

In some embodiments, the vehicle controller P43 may send a prompt message to an interactive device (e.g. a dashboard, an audio player, etc. of the vehicle) that can deliver the prompt message to the driver by means of text, voice, image, etc, so as to prompt the vehicle driver via the interactive device that it prepares to heat the battery pack P1. Illustratively, a VCU control dashboard may display "The vehicle needs to be heated, the expected heating duration is XXX" to alert the driver that the vehicle needs to be heated. In some embodiments, the prompt message is available to the driver as a basis for determining whether the heating procedure needs to be performed. The prompt message may include information about an expected heating duration, an expected heating temperature, an expected remaining power, and the like that may assist the driver in determining whether to perform the heating operation. The expected heating duration may be determined according to parameters such as a frequency of a driving signal, a duty ratio of the driving signal, a difference between a current temperature and the expected heating temperature of the battery pack, and heating performance of the battery pack P1, which is not limited herein. The expected remaining power can be obtained according to a difference between a current SOC of the battery pack and an expected SOC to be consumed, and the manner of obtaining the expected remaining power is not limited herein.

In some embodiments, the vehicle controller P43 may acquire information such as the driver's motion, voice, image, and the like through the vehicle dashboard, the audio acquisition device, and the like, and determine the driver's operation intention based on the acquired information. That is, when the information includes a triggering operation input by the driver to heat the battery pack P1, the vehicle controller P43 may determine that the driver confirms that the battery pack needs to be heated when detecting the triggering operation input by the driver. Illustratively, under the control of the vehicle controller P43, an option for the driver to select whether to heat the battery pack P1 may be displayed on the vehicle dashboard. Also, in response to the driver's triggering operation on the heating option, the first control signal may be sent to the motor controller P42.

In the embodiment, the battery pack heating system can be controlled in connection with the battery management system P41, the motor controller P42, the vehicle controller P43, and the driver's operation, thereby further improving the control accuracy.

In some embodiments of the application, the control system for the battery pack heating system can also control the heating safety of the battery pack heating system during the heating process.

In this case, the motor controller P42 may be further configured to acquire a temperature of the inverter P2 and a temperature of the motor P3; and control all switch modules of the inverter P2 to be in an off state and report over-temperature information to the vehicle controller, when it is determined that at least one of both the temperature of the inverter and the temperature of the motor meets a preset over-temperature condition.

In some embodiments, the preset over-temperature condition may be that the temperature exceeds a corresponding temperature threshold range.

An upper limit value of the temperature threshold range corresponding to the temperature of the inverter may be a highest temperature at which each bridge arm switch module can work normally. An upper limit value of the temperature threshold range corresponding to the temperature of the motor can be a highest temperature at which each device in the motor can operate normally.

In some embodiments, a real-time temperature of a switch module of each phase bridge arm can be acquired via a temperature sensor, and the temperature of the inverter P2 can be determined according to the real-time temperature of the switch module of each phase bridge arm.

In other embodiments, a real-time temperature of each phase coil of the motor P3 can be acquired via a temperature sensor, and the temperature of the motor P3 can be determined according to the real-time temperature of each phase coil.

It should be noted that, in the embodiments of the application, during the heating of the battery pack P1 by the battery pack heating system, only the target upper bridge arm switch module and the target lower bridge arm switch module are controlled to be periodically turned on or off, while other switch modules in the inverter P2 except the target upper bridge arm switch module and the target lower bridge arm switch module are kept in an off state. Therefore, when it is necessary to stop heating the battery pack P1, all switch modules of the inverter P2 can be controlled to be in an off state by controlling the target upper bridge arm switch module and the target lower bridge arm switch module to be turned off. According to the embodiments of the application, the temperatures of the inverter P2 and the motor P3 in the battery pack heating system are acquired for monitoring. When there is an over-temperature device in the battery pack heating system, the battery pack heating system may be controlled to stop heating the battery pack P1, thereby reducing the possibility that an over-temperature fault in the battery pack heating system damages the battery pack heating system or the battery pack, improving the safety of the battery pack heating, and enhancing the service life and safety of the device.

In some embodiments of the application, the control system P4 of the battery pack heating system may also control the battery pack heating system through the battery management system P41, the motor controller P42, and the vehicle controller P43 during the heating process.

The battery management system P41 may be further configured to acquire a target state parameter of the battery pack, and send a stop-heating request to the vehicle controller P43 when the target state parameter exceeds a corresponding parameter safety range.

The target state parameter includes at least one of the following parameters: a temperature, a state of charge (SOC), and an insulation resistance value.

In some embodiments, when the target state parameter includes the temperature, the corresponding parameter safety range may be used to characterize a temperature range in which the battery needs to be heated, and an upper limit value of the parameter safety range is an expected temperature threshold, and the parameter safety range has no lower limit value. That is, when the temperature of the battery pack P1 has reached the expected temperature threshold during the heating, the stop-heating request is sent to the vehicle controller P43. In an example, the stop-heating request is used to inform the vehicle controller P43 that the battery pack P1 has reached the expected heating temperature and it needs to stop heating the battery pack.

In some embodiments, when the target state parameter includes a SOC, the corresponding parameter safety range is used to characterize the remaining charge of the battery sufficient for the expected remaining consumption of the current heating. The parameter safety range can be set according to specific working scenes and working demands, which is not limited herein. When a real-time SOC is lower than a lower limit value of the corresponding parameter safety range, the vehicle controller P43 may be informed that it is necessary to stop heating the battery pack due to a low power of the battery pack.

In some embodiments, when the target state parameter includes an insulation resistance value, the corresponding parameter safety range is used to characterize a reasonable range of the insulation resistance value. The parameter safety range can be set according to specific working scenes and working demands, which is not limited herein. When a real-time SOC is lower than a lower limit value of the corresponding parameter safety range, the vehicle controller P43 may be informed that it is necessary to stop heating the battery pack due to a low insulation resistance value.

The insulation resistance value is an insulation resistance value of the positive and negative electrodes of the battery pack relative to a low-voltage ground of the vehicle.

It should be noted that, in the embodiments of the application, after the battery management system enters an operating state, the battery management system may automatically acquire the target state parameter of the battery pack to determine whether the target state parameter exceeds the corresponding parameter security range, and send the stop-heating request to the vehicle controller when the target state parameter exceeds the corresponding parameter safety range.

The vehicle controller P43 may also be configured to send a stop signal to the motor controller P42 in response to the stop-heating request.

In some embodiments, the stop signal indicates that it is necessary to control the battery pack heating system to stop heating the battery pack.

The motor controller P42 may receive the stop signal and control all switch modules of the inverter to be in an off state. That is, the target upper bridge arm switch module and the target lower bridge arm switch module may be controlled to be turned off.

In the embodiments of the application, the control system P4 of the battery pack heating system can detect the state of the battery pack P1 during the entire heating process, thereby improving the control accuracy. Moreover, the control system P4 of the battery pack heating system can monitor whether the target state data of the battery pack is abnormal, and can timely control the battery pack heating system to stop heating the battery pack when the target state data is abnormal, thereby improving heating safety.

It should be noted that when the target state data includes the insulation resistance value and the support capacitor needs to be pre-charged before the formal heating, the insulation resistance value needs to be monitored after the pre-charging is completed until the heating is formally started as well as during the heating process. When the insulation resistance value is abnormal after the pre-charging is completed until the heating is formally started, the motor control P42 controls the target upper bridge arm switch module and the target lower bridge arm switch module to remain in the off state.

In some embodiments of the application, in order to avoid voltage and current overshoot during the heating, it may be needed to use the battery management system P41 and the vehicle controller P43 to pre-charge the support capacitor Ca before the battery pack P1 is formally heated.

Specifically, the vehicle controller P43 may be further configured to send a second control signal to the battery management system P41 for instructing the battery management system P41 to enter a heating operation mode.

The battery management system P41 may be further configured to: control to pre-charge the support capacitor Ca connected in parallel with the inverter in response to the second control signal; and control to stop pre-charging the support capacitor, and send pre-charging completion information to the vehicle controller P43, when it is determined that the pre-charging of the support capacitor Ca is completed.

As an example, a main positive relay is provided between the positive electrode of the battery pack P1 and a connection line of the inverter P2, a main negative relay is provided between the negative electrode of the battery pack P1 and a connection line of the inverter P2, and a pre-charging relay is connected in parallel with either the main positive relay or the main negative relay. The battery management system P41 may control the pre-charging relay to close, so as to control the battery pack P1 to start pre-charging the support capacitor. For example, when the pre-charging relay is connected in parallel with the main positive relay, the support capacitor may be pre-charged by closing the pre-charge relay and the main negative relay.

As another example, the battery management system P41 may control the pre-charging relay to open, so as to control the battery pack P1 to stop pre-charging the support capacitor. Also, after the pre-charging process is completed, the main positive relay and the main negative relay may be controlled to close, so as to enable the battery pack heating system to heat the battery pack P1.

In some embodiments, the vehicle controller P43 may send the first control signal to the motor controller P42 in response to the heating request information, the feedback information, and the pre-charging completion information.

In some embodiments, other control devices of the control system P4 of the battery pack heating system may also be involved in the pre-charging process. For example, motor controller P42 may be involved in the pre-charging process. Specifically, the motor controller P42 may assist in determining whether the pre-charging process is completed by monitoring a busbar voltage.

In some embodiments, after the pre-charging is completed, in other words, after the battery pack P1 is controlled to stop pre-charging the support capacitor, the battery management system P41 may acquire the state parameter of the battery pack P1 and determine whether the state parameter of the battery pack P1 satisfies the preset heating condition.

In the embodiments of the application, the battery pack may have a certain temperature rise or consume a certain amount of power during the pre-charging process. With the determination by the battery management system P41, it is possible to avoid the impacts of the temperature rise or the power consumption during the pre-charging process on the heating of the battery pack, thereby improve the control accuracy.

In some embodiments of the application, the motor controller P42 may be further configured to receive a stop signal to allow a voltage across the support capacitor to return to a safe voltage range.

In the embodiments of the application, the safety of the battery heating system can be improved by internally discharging the voltage across the support capacitor to the safe voltage range. It should be noted that the voltage across the support capacitor can be discharged to the safe voltage range in various manners, for example, by turning on the switch module in the inverter, which is not limited herein.

It should also be noted that after receiving the stop signal, the motor controller P42 may firstly cause the voltage across the support capacitor to return to the safe voltage range, and then control all switch modules in the inverter to be in the off state. The execution order of the two actions is not limited in the embodiments of the application.

In some embodiments of the application, the control system P4 of the battery pack heating system may also control, via the motor controller P42 and the vehicle controller P43, the heating current generated by the battery pack heating system.

Specifically, the motor controller P42 may be further configured to acquire a current parameter of the battery pack heating system; report abnormal current information to the vehicle controller when the current parameter exceeds a preset desired current threshold range; calculate a desired frequency and a desired duty cycle of a driving signal based on the preset desired current threshold range; and adjust a frequency and a duty cycle of the driving signal to the desired frequency and the desired duty cycle.

The driving signal may be configured to drive the target upper bridge arm switch module and the target lower bridge arm switch module to be periodically turned on or off.

In some embodiments, the current parameter may include one or more of the following parameters: a busbar current between the battery pack and the inverter, and phase currents between individual energy storage modules and respective bridge arms corresponding to the individual energy storage modules.

When the current parameter includes a busbar current between the battery pack and the inverter, the current sensor may be disposed on a connection line between the battery pack P1 and the inverter. When the battery pack includes a phase current between each energy storage module and a corresponding bridge arm, the current sensor may be disposed between the other end of the energy storage module and the connection point of the upper bridge arm and the lower bridge arm of the bridge arm corresponding to the energy storage module.

In some embodiments, the preset desired current threshold range characterizes an allowable range of heating current during the heating. In an embodiment, the preset desired current threshold range may be a range with the desired heating current as an intermediate value. Illustratively, the desired heating current can be the desired busbar current.

Since the heating current is proportional to the heating rate, when the obtained current parameter is less than the lower limit value of the preset desired current threshold range, it means that the current for heating the battery pack P1 is too small, and the abnormal current information may be used to prompt the vehicle controller to increase the heating current. When the obtained current parameter is greater than the upper limit value of the preset desired current threshold range, it means that the current for heating the battery pack P1 is too large, and the abnormal current information may be used to prompt the vehicle controller to reduce the heating current.

It should be noted that when the current exceeds the upper limit of the preset desired current threshold range, overheating may occur. In the embodiments of the application, by adjusting the current to return to the preset desired current threshold range, the heating safety can be improved, and the devices in the battery pack P1 and the battery pack heating system can be protected.

In some embodiments, the desired frequency and the desired duty cycle of the driving signal may be adjusted according to the preset desired current threshold range, so as to make the current parameter to return to the preset desired current threshold range.

In an embodiment, the desired frequency and the desired duty cycle of the driving signal can be calculated according to formula (1).

$$I = U1 \times (2D-1)/4fL \qquad (1)$$

Here, I represents the effective current, D represents the duty cycle of the driving signal, f represents the frequency of the driving signal, U1 represents the voltage across the battery pack P1, and L represents the inductance of the stator inductor.

As a specific example, the effective value of the desired heating current can be substituted into the formula (1) as the parameter I to calculate the desired duty ratio D and the desired frequency f.

In other embodiments, the desired frequency and the desired duty cycle of the driving signal may be adjusted based on the acquired current parameter and the preset desired current threshold range, so as to make the current parameter to return to the preset desired current threshold range. For example, according to the acquired current parameter and the preset desired current threshold range, the desired frequency and the desired duty cycle of the driving signal may be adjusted by using a proportional-integral-differential (PID) method, so as to make the current parameter to return to the preset desired current threshold range.

The specific method for calculating the desired duty ratio D and the desired frequency f is not limited in the embodiments of the application. In some embodiments, in order to prevent damages of the circuits or devices in the battery pack or the battery pack heating system due to excessive currents, the motor controller P42 can also control all switch modules of the inverter to be in an off state when the current parameter exceeds the preset desired current threshold range.

In other embodiments, in order to balance safety and heating efficiency, when the current parameter exceeds the preset desired current threshold range but does not exceed a safe current range, the motor controller P42 may continue to drive the target upper bridge arm switch module and the target lower bridge arm switch module to be periodically turned on or off according to the driving signal. When the current parameter exceeds the safe current range, the motor controller P42 may control all switch modules of the inverter to be in the off state.

Here, the safe current range includes the preset desired current threshold range.

In some embodiments, the vehicle controller P43 may control the vehicle dashboard to display abnormal current information after receiving the abnormal current information, so that the vehicle driver can control the vehicle according to the abnormal current information, for example, to turn off the heating system, perform vehicle maintenance, and the like.

In some embodiments of the application, the control system P4 for the battery pack heating system can also control the heating rate of the battery pack P1 by the battery pack heating system through the battery management system P41, the motor controller P42, and the vehicle controller P43.

The battery management system P41 may be further configured to acquire a real-time temperature rise rate of the battery pack P1. When it is determined that the real-time temperature rise rate of the battery pack P1 exceeds a preset desired temperature rise rate range, abnormal temperature rise information may be reported to the vehicle controller.

In some embodiments, the real-time temperature rise rate of the battery pack P1 may be calculated based on the real-time temperature of the battery pack P1. For the related content of the method for calculating the real-time temperature of the battery pack P1, the content of the foregoing embodiments may be referred to, and details will not be described herein again.

In some embodiments, the preset desired temperature rise rate range characterizes an allowable range of the temperature rise during the heating. In an embodiment, the preset desired temperature rise rate range may be a temperature rise rate range with the desired temperature rise rate being an intermediate value.

Since the heating current is proportional to the temperature rise rate, when the temperature rise rate is less than the lower limit of the preset desired temperature rise rate range, it means that the current for heating the battery pack P1 is too small, and the abnormal temperature rise information may be used to prompt the vehicle controller to increase the heating current. When the temperature rise rate is greater than the upper limit of the preset desired temperature rise rate range, it means that the current for heating the battery pack P1 is too large, and the abnormal temperature rise information may be used to prompt the vehicle controller to reduce the heating current.

The vehicle controller P42 may be further configured to forward the abnormal temperature rise information to the motor controller P43.

The motor controller P43 may be further configured to calculate, in response to the abnormal temperature rise information, the desired frequency and the desired duty ratio of the driving signal based on the preset desired temperature rise rate range, and adjust the frequency and the duty ratio of the driving signal to the desired frequency and the desired duty cycle.

The driving signal may be used to drive the target upper bridge arm switch module and the target lower bridge arm switch module to be periodically turned on or off.

In some embodiments, the preset desired temperature rise rate range may be sent to the motor controller P43 in advance, or may be derived by the motor controller P43 from the abnormal temperature rise information.

In some embodiments, the desired frequency and the desired duty cycle of the driving signal may be adjusted according to the preset desired temperature rise rate range, so as to make the temperature rise rate to return to the preset desired temperature rise rate range.

In an embodiment, the effective value of desired heating current can be determined according to the desired temperature rise rate and then put into the formula (1) to calculate the desired duty ratio and the desired frequency.

In other embodiments, the desired frequency and the desired duty cycle of the driving signal may be adjusted based on the real-time temperature rise rate and the preset desired temperature rise rate range, so as to make the temperature rise rate to return to the preset desired temperature rise rate range. For example, according to the real-time temperature rise rate and the preset desired temperature rise rate range, the desired frequency and the desired duty cycle of the driving signal may be adjusted by using a proportional-integral-differential (proportion-integral-differential, PID) method, so as to make the current parameter to return to the preset desired current threshold range.

The specific method for calculating the desired duty ratio D and the desired frequency f is not limited in the embodiments of the application.

In some embodiments, after receiving the abnormal temperature rise information, the vehicle controller P43 may further control the vehicle dashboard to display the abnormal temperature rise information, so that the vehicle driver can control the vehicle according to the abnormal temperature rise information, for example, to turn off the heating system, perform vehicle maintenance, and the like.

Based on the same concept, the control method for the battery pack heating system will be described in detail below with reference to FIG. 3. The control method for the battery pack heating system can be applied to the control system P4 for the battery pack heating system in the above embodiments.

Figure 3:
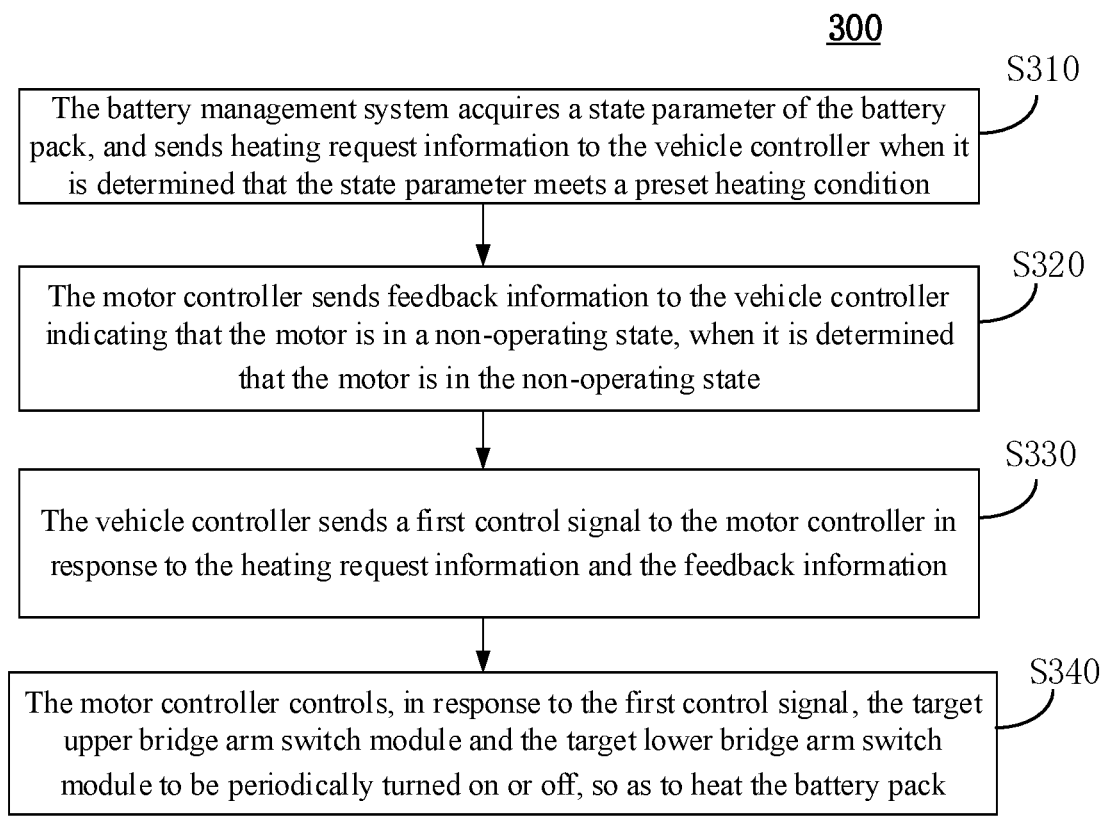
FIG. 3 is a schematic flow chart of a control method for a battery pack heating system according to another embodiment of the present application.

FIG. 3 is a schematic flow chart of a control method 300 for a battery pack heating system according to another embodiment of the present application. The method may include steps S310 to S340.

At S310, the battery management system P41 may acquire a state parameter of the battery pack P1, and send heating request information to the vehicle controller P43 when it is determined that the state parameter of the battery pack P1 meets a preset heating condition.

In some embodiments of the application, the state parameter of the battery pack P1 may include a temperature of the battery pack P1 and/or a state of charge (SOC) of the battery pack P1.

When the state parameter of the battery pack P1 includes the temperature of the battery pack P1, the preset heating condition may include that the temperature of the battery pack P1 is lower than an expected temperature threshold.

When the state parameter of the battery pack P1 includes the SOC, the preset heating condition may include that the SOC of the battery pack P1 is higher than a SOC threshold that designates a SOC to be consumed during the current heating.

For the related content of the temperature of the battery pack P1, the SOC of the battery pack P1, the expected temperature threshold, and the SOC threshold, the content of the foregoing embodiments may be referred to, and details will not be described herein again.

At S320, the motor controller P42 may send feedback information to the vehicle controller P43 indicating that the motor P3 is in a non-operating state, when it is determined that the motor P3 is in the non-operating state.

For the related content of S320, the content of the foregoing embodiments may be referred to, and details will not be described herein again.

At S330, the vehicle controller P43 may send a first control signal to the motor controller P42 in response to the heating request information and the feedback information.

In some embodiments of the application, S330 may be specifically implemented by including S331 and S332.

At S331, the vehicle controller P43 may provide, in response to the heating request information and the feedback information, a prompt message to inform that the battery pack P1 is to be heated.

For the related content of the prompt message, the content of the foregoing embodiments may be referred to, and details will not be described herein again.

At S332, the vehicle controller P43 may send the first control signal to the motor controller P42 in response to an input triggering operation for the battery pack P1.

For the related content of the triggering operation and the first control signal, the content of the foregoing embodiments may be referred to, and details will not be described herein again.

At S340, the motor controller P42 may control, in response to the first control signal, the target upper bridge arm switch module and the target lower bridge arm switch module to be periodically turned on or off, so as to heat the battery pack P1.

According to the control method for the battery pack heating system in the embodiments of the application, the vehicle controller P43 can control the motor controller to heat the battery pack in response to the heating request information and the feedback information. Since the heating request information is sent by the battery management system P41 after determining that the acquired state parameter of the battery pack P1 meets the preset heating condition, it can indicate that the battery pack needs to be heated; since the feedback information is sent by the motor controller P42 after determining that the motor P3 in the battery pack heating system is in the non-operating state, it can indicate that the battery pack heating system meets the condition for heating the battery pack P1. Therefore, the control method in the embodiments of the application can control the battery pack heating system by using the interaction between the battery management system P41, the motor controller P42, and the vehicle controller P43, and control the battery pack heating system to heat the battery pack P1 when determining that the battery pack P1 needs to be heated and the battery pack heating system meets the heating condition, thereby improving the control accuracy of the battery pack heating system.

In some embodiments of the application, the control method for the battery pack heating system may further include step S351.

At S351, the vehicle controller P43 may determine whether the state of the vehicle controller P43, the state of the battery management system P41, and the state of the motor controller P42 are normal operating states, in response to detection of a vehicle start signal.

In some embodiments, when any of the vehicle controller P43, the battery management system P41, and the motor controller P42 is in an abnormal operating state, the control method 300 for the battery pack heating system may further include: the vehicle controller P43 may report state information indicating an abnormal device fault.

In some embodiments of the application, in order to achieve fine control of the battery pack heating system P2 during the heating process of the battery pack P1, and further improve the heating safety of the battery pack heating system P2, the control method 300 for the battery pack heating system may further include steps S361 and S362.

At S361, the motor controller P42 may acquire the temperature of the inverter P2 and the temperature of the motor P3.

For the related content of the temperature of the inverter P2 and the temperature of the motor P3, the content of the foregoing embodiments may be referred to, and details will not be described herein again.

At S362, when it is determined that at least one of both the temperature of the inverter P2 and the temperature of the motor P3 meets a preset over-temperature condition, the motor controller P42 may control all the switching modules of the inverter P2 to be in an off state, and report over-temperature information to the vehicle controller.

The preset over-temperature condition may be used to represent a condition for determining that a device with an over-temperature risk exists in the battery pack heating system P2. For the related content of the preset over-temperature condition, the content of the foregoing embodiments may be referred to, and details will not be described herein again.

In some embodiments of the application, the control method 300 for the battery pack heating system may further include steps S371 to S373.

At S371, the battery management system P41 may acquire a target state parameter of the battery pack P1, and send a stop-heating request to the vehicle controller P43 when the target state parameter exceeds a corresponding parameter safety range. The target state parameter may include at least one of the following parameters: a temperature, a state of charge (SOC), and an insulation resistance value.

For the related content of the temperature, the SOC, the insulation resistance value and the respectively corresponding parameter safety range, the content of the foregoing embodiments may be referred to, and details will not be described herein again.

At S372, the vehicle controller P43 may send a stop signal to the motor controller P42 in response to the stop-heating request.

At S373, the motor controller P42 may receive the stop signal, and control all the switch modules of the inverter P2 to be in an off state.

In some embodiments of the application, when the battery pack heating system includes a support capacitor in parallel with the inverter P2, in order to ensure the safety of the battery pack heating system, it is necessary to pre-charge the support capacitor before starting to heat the battery pack P1. In this case, prior to S330, the control method 300 for the battery pack heating system may further include steps S381 to S383.

At S381, the vehicle controller P43 may send a second control signal to the battery management system P41 for instructing the battery management system P41 to enter a heating operation mode.

At S382, the battery management system P41 may control to pre-charge the support capacitor connected in parallel with the inverter P2, in response to the second control signal.

At S383, the battery management system P41 may control the battery pack to stop pre-charging the support capacitor and send pre-charging completion information to the vehicle controller, after it is determined that the pre-charging of the support capacitor is completed.

For the related content of the implementation of the pre-charging, the content of the foregoing embodiments may be referred to, and details will not be described herein again.

For the related content of the implementation of the operation of stopping the pre-charging, the content of the foregoing embodiments may be referred to, and details will not be described herein again.

For the related content of the second control signal, the content of the foregoing embodiments may be referred to, and details will not be described herein again.

In some embodiments of the application, the control system for the battery pack heating system can also control the degree of fineness of heating of the battery pack P1 by the battery pack heating system P2. Accordingly, the control method 300 of the battery pack heating system further includes step S391.

At S391, the motor controller P42 may acquire the current parameter of the battery pack heating system P2, report abnormal current information to the vehicle controller P43 when the current parameter exceeds a preset desired current threshold range, calculate a desired frequency and a desired duty cycle of a driving signal based on the preset desired current threshold range, and adjust a frequency and a duty cycle of the driving signal to the desired frequency and the desired duty cycle.

The current parameter includes one or more of the following parameters: a busbar current between the battery pack P1 and the inverter P2, and phase currents between individual energy storage modules in the motor P3 and respective bridge arms corresponding to the individual energy storage modules.

For the related content of the current parameter and the preset desired current threshold, the content of the foregoing embodiments may be referred to, and details will not be described herein again.

The driving signal may be used to drive the target upper bridge arm switch module and the target lower bridge arm switch module to be periodically turned on or off.

For the related content of the desired frequency and the desired duty ratio of the driving signal, the content of the foregoing embodiments may be referred to, and details will not be described herein again.

In some embodiments, after S391, the control method 300 for the battery pack heating system may further include step S392.

At S392, the vehicle controller P43 may control the vehicle dashboard to display abnormal current information, so that the vehicle driver can control the vehicle according to the abnormal current information, for example, to turn off the heating system, perform vehicle maintenance, and the like.

In some embodiments of the application, the control system for the battery pack heating system can also control the degree of fineness of heating of the battery pack P1 by the battery pack heating system P2. Accordingly, the control method 300 for the battery pack heating system may further include steps S393 to S395.

At S393, the battery management system P41 may acquire a real-time temperature rise rate of the battery pack, and report abnormal temperature rise information to the vehicle controller P43 when it is determined that the real-time temperature rise rate of the battery pack P1 exceeds a preset desired temperature rise rate range.

At 394, the vehicle controller P43 may forward the abnormal temperature rise information to the motor controller P42.

At S395, the motor controller P42 may calculate, in response to the abnormal temperature rise information, a desired frequency and a desired duty cycle of a driving signal based on the preset desired temperature rise rate range, and adjust a frequency and a duty cycle of the driving signal to the desired frequency and the desired duty cycle.

The driving signal may be configured to drive the target upper bridge arm switch module and the target lower bridge arm switch module to be periodically turned on or off.

In some embodiments, after S393, the control method 300 for the battery pack heating system may further include step S396.

At S396, the vehicle controller P43 may control the vehicle dashboard to display abnormal temperature rise information after receiving the abnormal temperature rise information, so that the vehicle driver can control the vehicle according to the abnormal temperature rise information, for example, to turn off the heating system, perform vehicle maintenance, and the like.

In some embodiments of the application, the communication between the above modules and devices may be wired communication or wireless communication, which is not limited herein.

It is to be understood that various embodiments in the specification are described in a progressive manner, and the same or similar parts between the various embodiments may be referred to each other, and each embodiment focuses on the difference from other embodiments. The method embodiments are described in a relatively simple manner. For related content, refer to the description of the system embodiments. The application is not limited to the specific steps and structures described above and illustrated in the drawings. A person skilled in the art can make various changes, modifications and additions or change the order between the steps, with the understanding of the gist of the application. Also, a detailed description of known method techniques is omitted herein for the sake of conciseness.

The functional modules (such as the energy storage module, the switch module, the battery management system, the CMC, the motor management system, and the vehicle controller) in the above embodiments may be implemented as hardware, software, firmware, or a combination thereof. When implemented in hardware, the functional modules may be, for example, an electronic circuit, an application specific integrated circuit (ASIC), suitable firmware, plug-in, a function card, and the like. When implemented in software, the elements of the application may be programs or code segments that are used to perform required tasks. The programs or code segments can be stored in a machine readable medium or transmitted over a transmission medium or a communication link via a data signal carried in a carrier. A "machine readable medium" may include any medium that can store or transfer information.

What is claimed is:

1. A control method for heating a battery pack, characterized by comprising:
   sending by a motor controller, to a vehicle controller, feedback information indicating that a motor is in a non-operating state, when it is determined that the motor is in the non-operating state; and
   controlling by the motor controller, in response to a first control signal, a battery pack heating system to periodically charge or discharge the battery pack,
   wherein the first control signal is sent by the vehicle controller to the motor controller in response to the feedback information from the motor controller and heating request information from a battery management system, and configured to instruct the motor controller to control the battery pack heating system to periodically charge or discharge the battery pack.

2. The control method for heating the battery pack according to claim 1, wherein the controlling by the motor controller, in response to a first control signal, a battery pack heating system to periodically charge or discharge the battery pack comprises:
   controlling, by the motor controller, a target upper bridge arm switch module and a target lower bridge arm switch module of an inverter in the battery pack heating system to be periodically turned on or off, to charge or discharge the battery pack.

3. The control method for heating the battery pack according to claim 2, further comprising:
   acquiring, by the motor controller, a temperature of an inverter in the battery pack heating system and a temperature of the motor; and
   controlling, by the motor controller, all switch modules of the inverter to be in an off state, when it is determined that at least one of both the temperature of the inverter and the temperature of the motor meets a preset over-temperature condition.

4. The control method for heating the battery pack according to claim 1, wherein the controlling by the motor controller, in response to a first control signal, a battery pack heating system to periodically charge or discharge a battery pack comprises:
   controlling by the motor controller, in response to the first control signal and via a periodic driving signal, the battery pack heating system to periodically charge or discharge the battery pack.

5. The control method for heating the battery pack according to claim 4, further comprising:
   acquiring, by the motor controller, a current parameter of the battery pack heating system; and
   calculating, when the current parameter exceeds a preset desired current threshold range, a desired frequency and a desired duty cycle of the periodic driving signal based on the preset desired current threshold range, and adjusting a frequency and a duty cycle of the periodic driving signal to the desired frequency and the desired duty cycle,
   wherein the current parameter comprises one or more of the following parameters: a busbar current between the battery pack and an inverter in the battery pack heating system, and phase currents between individual energy storage modules in the motor and respective bridge arms corresponding to the individual energy storage modules.

6. The control method for heating the battery pack according to claim 4, further comprising:
   calculating by the motor controller, in response to abnormal temperature rise information, a desired frequency and a desired duty cycle of the periodic driving signal based on a preset desired temperature rise rate range; and adjusting a frequency and a duty cycle of the periodic driving signal to the desired frequency and the desired duty cycle,
   wherein the abnormal temperature rise information is sent to the motor controller by the vehicle controller and used to prompt the vehicle controller to increase or reduce heating current.

7. A motor controller, characterized by comprising:
   a first module, configured to send, to a vehicle controller, feedback information indicating that a motor is in a non-operating state, when it is determined that the motor is in the non-operating state; and
   a second module, configured to control, in response to a first control signal, a battery pack heating system to periodically charge or discharge a battery pack,
   wherein the first control signal is sent by the vehicle controller to the motor controller in response to the feedback information from the motor controller and heating request information from a battery management system, and configured to instruct the motor controller to control the battery pack heating system to periodically charge or discharge the battery pack.

8. The motor controller according to claim 7, wherein:
   the second module is configured to control a target upper bridge arm switch module and a target lower bridge arm switch module of an inverter in the battery pack heating system to be periodically turned on or off, to periodically charge or discharge the battery pack.

9. The motor controller according to claim 8, further comprising a fourth module configured to acquire a temperature of an inverter (P2) in the battery pack heating system and a temperature of the motor,
 wherein the second module is further configured to control all switch modules of the inverter to be in an off state, when it is determined that at least one of both the temperature of the inverter and the temperature of the motor meets a preset over-temperature condition.

10. The motor controller according to claim 7, wherein:
 the second module is configured to control, via a periodic driving signal, the battery pack heating system to periodically charge or discharge the battery pack.

11. The motor controller according to claim 10, further comprising a third module, wherein the third module is configured to: calculate a desired frequency and a desired duty cycle of the periodic driving signal; and adjust a frequency and a duty cycle of the periodic driving signal to the desired frequency and the desired duty cycle.

12. The motor controller according to claim 11, wherein the third module is configured to: calculate the desired frequency and the desired duty cycle of the periodic driving signal based on a preset desired current threshold range; and adjust the frequency and the duty cycle of the periodic driving signal to the desired frequency and the desired duty cycle.

13. The motor controller according to claim 11, wherein the third module is configured to: calculate the desired frequency and the desired duty cycle of the periodic driving signal based on a preset desired temperature rise rate range; and adjust the frequency and the duty cycle of the periodic driving signal to the desired frequency and the desired duty cycle.

* * * * *